(12) United States Patent
Farjad-Rad

(10) Patent No.: US 10,291,440 B2
(45) Date of Patent: May 14, 2019

(54) METHODS AND CIRCUITS FOR ADAPTIVE EQUALIZATION

(71) Applicant: Rambus Inc., Sunnyvale, CA (US)

(72) Inventor: Ramin Farjad-Rad, Los Altos, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 15/978,506

(22) Filed: May 14, 2018

(65) Prior Publication Data

US 2018/0337806 A1    Nov. 22, 2018

Related U.S. Application Data

(63) Continuation of application No. 15/402,981, filed on Jan. 10, 2017, now Pat. No. 9,985,806, which is a continuation of application No. 14/818,171, filed on Aug. 4, 2015, now Pat. No. 9,544,170, which is a continuation of application No. 14/225,580, filed on Mar. 26, 2014, now Pat. No. 9,112,739, which is a continuation of application No. 13/797,948, filed on Mar. 12, 2013, now Pat. No. 8,705,606, which is a continuation of application No. 12/615,824, filed on Nov. 10, 2009, now Pat. No. 8,396,109, which is a continuation of application No. 12/543,983, filed on Aug. 19, 2009, now Pat. No. 8,446,940, which is a
(Continued)

(51) Int. Cl.
*H04L 25/03* (2006.01)
*H04L 25/08* (2006.01)
*H04L 1/00* (2006.01)

(52) U.S. Cl.
CPC .. *H04L 25/03159* (2013.01); *H04L 25/03019* (2013.01); *H04L 25/03343* (2013.01); *H04L 25/03885* (2013.01); *H04L 1/0071* (2013.01); *H04L 25/085* (2013.01); *H04L 2025/03681* (2013.01)

(58) Field of Classification Search
USPC ......... 375/232, 350, 233, 354, 229
See application file for complete search history.

(56) References Cited

U.S. PATENT DOCUMENTS

| | | |
|---|---|---|
| 4,187,479 A | 2/1980 | Ishizuka et al. |
| 4,459,698 A | 7/1984 | Yumoto et al. |

(Continued)

FOREIGN PATENT DOCUMENTS

WO    WO-2005-022750 A1    3/2005

OTHER PUBLICATIONS

U.S. Appl. No. 60/572,951, Farjad-rad, Ramin.
(Continued)

*Primary Examiner* — Eva Y Puente
(74) *Attorney, Agent, or Firm* — Silicon Edge Law Group LLP; Arthur J. Behiel

(57) ABSTRACT

An integrated circuit equalizes a data signal expressed as a series of symbols. The symbols form data patterns with different frequency components. By considering these patterns, the integrated circuit can experiment with equalization settings specific to a subset of the frequency components, thereby finding an equalization control setting that optimizes equalization. Optimization can be accomplished by setting the equalizer to maximize symbol amplitude.

20 Claims, 6 Drawing Sheets

Related U.S. Application Data continuation of application No. 10/938,373, filed on Sep. 10, 2004, now Pat. No. 7,639,736.

(60) Provisional application No. 60/572,951, filed on May 21, 2004.

(56) References Cited

U.S. PATENT DOCUMENTS

| | | | |
|---|---|---|---|
| 4,639,681 A | 1/1987 | Hasegawa | |
| 4,750,155 A | 6/1988 | Hsieh | |
| 4,985,900 A | 1/1991 | Rhind et al. | |
| 5,293,405 A | 3/1994 | Gersbach et al. | |
| 5,384,551 A | 1/1995 | Kennedy et al. | |
| 5,682,112 A | 10/1997 | Fukushima | |
| 5,703,853 A | 12/1997 | Horigome et al. | |
| 5,764,695 A | 6/1998 | Nagaraj et al. | |
| 5,844,431 A | 12/1998 | Chen | |
| 5,850,422 A | 12/1998 | Chen | |
| 5,991,339 A | 11/1999 | Bazes et al. | |
| 5,999,056 A | 12/1999 | Fong | |
| 6,038,266 A | 3/2000 | Lee et al. | |
| 6,192,071 B1 | 2/2001 | Hirth et al. | |
| 6,225,795 B1 | 5/2001 | Stratakos et al. | |
| 6,265,911 B1 | 7/2001 | Nairn | |
| 6,266,379 B1 | 7/2001 | Dally | |
| 6,282,690 B1 | 8/2001 | McClellan et al. | |
| 6,329,874 B1 | 12/2001 | Ye et al. | |
| 6,429,692 B1 | 8/2002 | Chan et al. | |
| 6,438,187 B1 | 8/2002 | Abbey | |
| 6,496,911 B1 | 12/2002 | Dixon et al. | |
| 6,570,916 B1 | 5/2003 | Feldbaumer et al. | |
| 6,624,688 B2 | 9/2003 | Jaussi et al. | |
| 6,658,054 B1 | 12/2003 | Kuribayashi et al. | |
| 6,717,995 B2 | 4/2004 | Zvonar | |
| 6,731,683 B1 | 5/2004 | Fiedler et al. | |
| 6,812,872 B1 | 11/2004 | Lu | |
| 6,992,855 B2 | 1/2006 | Ehrlich | |
| 7,030,657 B2 | 4/2006 | Stojanovic et al. | |
| 7,035,330 B2 | 4/2006 | Shanbhag et al. | |
| 7,092,472 B2 | 8/2006 | Stojanovic | |
| 7,126,378 B2 | 10/2006 | Stojanovic et al. | |
| 7,173,993 B2 | 2/2007 | Engl et al. | |
| 7,176,721 B2 | 2/2007 | Ho et al. | |
| 7,194,025 B2 | 3/2007 | Wood et al. | |
| 7,233,164 B2 | 6/2007 | Stojanovic et al. | |
| 7,286,597 B2 | 10/2007 | Buchwald et al. | |
| 7,310,397 B2 | 12/2007 | Smith et al. | |
| 7,315,591 B2 | 1/2008 | Daishin et al. | |
| 7,315,594 B2 | 1/2008 | Schmatz et al. | |
| 7,315,596 B2 | 1/2008 | Payne et al. | |
| 7,325,175 B2 | 1/2008 | Momtaz | |
| 7,397,848 B2 | 7/2008 | Stojanovic et al. | |
| 7,397,876 B2 | 7/2008 | Cranford, Jr. et al. | |
| 7,400,675 B2 | 7/2008 | Moughabghab et al. | |
| 7,406,135 B2 | 7/2008 | Cranford, Jr. et al. | |
| 7,418,069 B2 | 8/2008 | Schmatz et al. | |
| 7,496,161 B2 | 2/2009 | Chou et al. | |
| 7,555,091 B1 | 6/2009 | Lewicki et al. | |
| 7,639,736 B2 | 12/2009 | Farjad-rad | |
| 7,664,170 B2* | 2/2010 | Tonietto | G11B 20/10009 342/92 |
| 7,715,471 B2 | 5/2010 | Werner et al. | |
| 7,742,520 B2 | 6/2010 | Simpson et al. | |
| 7,974,337 B2* | 7/2011 | Momtaz | H03G 3/3084 375/229 |
| 8,396,109 B2 | 3/2013 | Farjad-rad | |
| 8,446,940 B2 | 5/2013 | Farjad-rad | |
| 8,705,606 B2 | 4/2014 | Farjad-rad | |
| 8,917,803 B1* | 12/2014 | Asuncion | H04L 7/033 375/229 |
| 9,112,739 B2 | 8/2015 | Farjad-rad | |
| 2002/0009167 A1 | 1/2002 | Farjad-rad | |
| 2002/0044618 A1 | 4/2002 | Buchwald et al. | |
| 2004/0005001 A1 | 1/2004 | Jones et al. | |
| 2004/0008059 A1 | 1/2004 | Chen et al. | |
| 2004/0032813 A1 | 2/2004 | Lee et al. | |
| 2004/0052309 A1 | 3/2004 | Li | |
| 2004/0091028 A1 | 5/2004 | Aronson et al. | |
| 2004/0190661 A1* | 9/2004 | Vrazel | H04L 25/03885 375/350 |
| 2005/0047500 A1 | 3/2005 | Gupta et al. | |
| 2005/0108600 A1 | 5/2005 | Arguelles | |
| 2005/0180536 A1 | 8/2005 | Payne et al. | |
| 2005/0271137 A1 | 12/2005 | Kolze et al. | |
| 2005/0271169 A1 | 12/2005 | Momtaz et al. | |
| 2006/0002497 A1 | 1/2006 | Zhang | |
| 2006/0188043 A1 | 8/2006 | Zerbe et al. | |
| 2006/0251195 A1 | 11/2006 | Chen et al. | |
| 2006/0256892 A1 | 11/2006 | Momtaz | |
| 2006/0280240 A1 | 12/2006 | Kikugawa et al. | |
| 2007/0002942 A1 | 1/2007 | Simpson et al. | |
| 2007/0064848 A1 | 3/2007 | Desai | |
| 2007/0110199 A1 | 5/2007 | Momtaz et al. | |
| 2007/0195874 A1 | 8/2007 | Aziz et al. | |
| 2007/0253475 A1 | 11/2007 | Palmer | |
| 2008/0037693 A1 | 2/2008 | Andrus et al. | |
| 2008/0107165 A1 | 5/2008 | Nicolescu et al. | |
| 2008/0112521 A1 | 5/2008 | Schmatz et al. | |
| 2008/0247452 A1 | 10/2008 | Lee | |
| 2008/0285695 A1 | 11/2008 | Cranford, Jr. et al. | |
| 2009/0076939 A1 | 3/2009 | Berg et al. | |
| 2009/0237138 A1 | 9/2009 | Shanbhag et al. | |
| 2010/0008414 A1 | 1/2010 | Lee et al. | |
| 2010/0027606 A1 | 2/2010 | Dai et al. | |
| 2012/0170638 A1 | 7/2012 | Chen | |
| 2012/0224621 A1* | 9/2012 | Stojanovic | H04L 25/063 375/233 |
| 2013/0148704 A1 | 6/2013 | Shinmyo et al. | |
| 2017/0170992 A1 | 6/2017 | Hidaka | |

OTHER PUBLICATIONS

Baker, Alan J., "An Adaptive Cable Equalizer for Serial Digital Video Rates to 400Mb/s," 1996 IEEE International Solid-State Circuits Conference, Session 10, Low-Power & Communication Signal Processing, Paper FA 10.7. 3 pages.

Chen et al., "A 1.25Gb/s, 460mW CMOS Transceiver for Serial Data Communication," ISSCC97, Session 15, Serial Data Communications, Paper FP 15.3, pp. 242-243, 465, Feb. 7, 1997. 3 pages.

Choi et al., "A CMOS 3.5Gbps Continuous-Time Adaptive Cable Equalizer with Joint Adaptation Method of Low-Frequency Gain and High-Frequency Boosting," 2003 Symposium on VLSI Circuits Digest of Technical Paper. 4 pages.

Dally et al., "Transmitter Equalization for 4-Gbps Signaling," IEEE Micro, vol. 17, No. 1, Jan./Feb. 1997, pp. 48-56. 9 pages.

Farjad-Rad et al., "0.622-8 Gbps 150mW Serial IO Macrocell with Fully Flexible Preemphasis and Equalization," Symposium on VLSI Circuits Digest of Technical Papers, Jun. 2003. 4 pages.

Farjad-Rad, Ramin re U.S. Appl. No. 12/615,824, filed Nov. 10, 2009, Office Action dated Aug. 25, 2010. 13 pages.

Farjad-Rad, Ramin, U.S. Appl. No. 12/543,983, filed Aug. 19, 2009, Office Action dated Mar. 11, 2011 re Advisory Action Before the Filing of an Appeal Brief. 2 Pages.

Farjad-Rad, Ramin, U.S. Appl. No. 12/543,983, filed Aug. 19, 2009, Response dated Mar. 8, 2011. 13 Pages.

Farjad-Rad, Ramin, U.S. Appl. No. 12/543,983, filed Aug. 19, 2009, re Response dated Sep. 7, 2010 to the Office Action dated May 5, 2010. 14 pages.

Farjad-Rad, Ramin, U.S. Appl. No. 12/543,983, filed Aug. 19, 2009 re Final Office Action dated Jan. 12, 2011. 7 Pages.

Farjad-Rad, Ramin, U.S. Appl. No. 12/543,983, filed Aug. 19, 2009 re Information Disclosure Statement dated May 24, 2011. 4 Pages.

Farjad-Rad, Ramin, U.S. Appl. No. 12/543,983, filed Aug. 19, 2009 re Information Disclosure Statement submitted Jan. 6, 2012. 3 Pages.

Farjad-Rad, Ramin, U.S. Appl. No. 12/543,983, filed Aug. 19, 2009 re Office Action dated May 5, 2010, includes Notice of References Cited and Information Disclosure Statement. 18 Pages.

(56) References Cited

OTHER PUBLICATIONS

Farjad-Rad, Ramin, U.S. Appl. No. 12/615,824, filed Nov. 20, 2009, re Response submitted Jul. 19, 2011 to the Office Action dated May 4, 2011. 9 pages.
Farjad-Rad, Ramin, U.S. Appl. No. 12/543,983, filed Aug. 19, 2009, Office Action dated Feb. 6, 2012. 11 pages.
Farjad-Rad, Ramin, U.S. Appl. No. 12/615,824, filed Nov. 10, 2009, Office Action dated Feb. 23, 2012 re Advisory Action Before the Filing of an Appeal Brief. 3 pages.
Farjad-Rad, Ramin, U.S. Appl. No. 12/615,824, filed Nov. 20, 2009, Office Action dated Feb. 15, 2011. 5 Pages.
Farjad-Rad, Ramin, U.S. Appl. No. 12/615,824, filed Nov. 20, 2009, Office Action dated May 4, 2011. 4 Pages.
Farjad-Rad, Ramin, U.S. Appl. No. 12/615,824, filed Nov. 20, 2009, Response submitted Feb. 22, 2011 to the Office Action dated Feb. 15, 2011. 8 Pages.
Farjad-Rad, Ramin, U.S. Appl. No. 12/615,824, filed Nov. 20, 2009, Response with mail date of Nov. 26, 2010 to the Office Action dated Aug. 25, 2010. 12 Pages.
Farjad-Rad, Ramin, U.S. Appl. No. 12/615,824, filed Nov. 10, 2009, Final Office Action dated Oct. 12, 2011. 8 Pages.
Granberg, Tom, "Handbook of Digital Techniques for High-Speed Design," Prentice Hall Modern Semiconductor Design Series, Copyright 2004 by Pearson Education, Inc. 12 pages.
Harwood et al., "24.1: a 12.5Gb/s SerDes in 65nm CMOS Using a Baud-Rate ADC with Digital Receiver Equalization and Clock Recovery," 2007 IEEE International Solid-State Circuits Conference, Feb. 14, 2007, pp. 436-437, 613, 24.1.1-24.1.7. 10 pages.
Harwood et al., "A 12.5Gb/s SerDes in 65nm CMOS Using a Baud Rate ADC with Digital RX Equalization and Clock Recovery," Slideshow Presentation, 2007 IEE International Solid-State Circuits Conference. 18 pages.
Information Disclosure Statement dated Jun. 10, 2011 re U.S. Appl. No. 12/615,824. 4 Pages.
Information Disclosure Statement submitted May 10, 2010 re U.S. Appl. No. 12/615,824. 2 Pages.
Inukai et al., "Boosted Gate MOS (BGMOS): Device/Circuit Cooperation Scheme to Achieve Leakage-Free Giga-Scale Integration," CICC 05/04 Technical Program. 4 pages.
Kudoh, Yoshiharu, "A 0.13—um CMOS 5-Gb/s 10-m 28 AWG Cable Transceiver with No-Feedback-Loop Continuous-Time Post-Equalizer," IEEE Journal of Solid-State Circuits, vol. 38, No. 5, May 2003. 6 pages.
Madduri, Vansanta, "High Speed Backplanes in Communications Systems," Mar. 2004. 7 pages.
Madduri, Vasanta, "High Speed Backplanes in Communications Systems," Slide Presented at the Communications Design Conference, Mar. 2004. 25 pages.
Meghelli et al., "4.1: A 10Gb/s 5-Tap-DFE/4-Tap-FFE Transceiver in 90nm CMOS," 2006 IEEE International Solid-State Circuits Conference, Feb. 6, 2006. 10 pages.
Napier, Tom, "Flash ADC Takes the Uncertainty Out of High-Speed Data Recovery," EDN Sep. 1, 1998, pp. 111-118. 5 pages.
Ramin et al., "Interconnects: Performance Bottleneck for Next Generation Systems," Slide Show Presentation, Presented at the VLSI Symposium in Japan, Jul. 2003. 21 pages.
Rao et al., "Circuit Techniques for Gate and Sub-Threshold Leakage Minimization in Future CMOS Technologies," European Solid-State Circuits Conference, Sep. 2003. 4 pages.
Shakiba, Mohammad Hossein, "A 2.5Gb/s Adaptive Cable Equalizer," 1999 IEEE International Solid-State Circuits Conference, Session 23, Paper WP 23.3. 2 pages.
Sidiropoulos et al., "A 700 Mb/s/pin CMOS Signaling Interface Using Current Integrating Receivers," IEEE Journal of Solid-State Circuits, vol. 32, No. 5, pp. 681-690, May 1997. 10 pages.
Stojanovic et al., "Adaptive Equalization and Data Recovery in a Dual-Mode (PAM2/4) Serial Link Transceiver," Rambus, Inc., Department of Electrical Engineering, Stanford University, Jan. 2004. 4 pages.
Stojanovic et al., "Transmit Pre-Emphasis for High-Speed Time-Division-Multiplexed Serial Link Transceiver," Submitted to IEEE Symposium on VLSI Circuits, Jun. 2004. 17 pages.
Widmer et al., "Single-Chip 4×500-MBd CMOS Transceiver," IEEE Journal of Solid-State Circuits, vol. 31, No. 12, Dec. 1996, pp. 2004-2014. 11 pages.
Zerbe et al., "Equalization and Clock Recovery for a 2.5—10 Gb/s 2-PAM/4-PAM Backplane Transceiver Cell," Presented at ISSCC 2003, Session 4, Clock Recovery and Backplane Transceivers, Paper 4.6. 10 pages.
Zerbe, Jared et al., "Equalization and Clock Recovery for a 2.5-10-Gb/s 2-PAM/4-PAM Backplane Transceiver Cell." IEEE Journal of Solid-State Circuits, vol. 38, No. 12, Dec. 2003. 10 Pages.
Zhang et al., "White Paper on Transmit Pre-Emphasis and Receive Equalization," Oct. 31, 2002. 8 pages.

\* cited by examiner

METHODS AND CIRCUITS FOR ADAPTIVE EQUALIZATION

FIELD OF THE INVENTION

The present invention relates generally to the field of communications, and more particularly to high speed electronic signaling within and between integrated circuit devices.

BACKGROUND

Serial communication links that employ channels that exhibit low pass filter effects often use transmit pre-emphasis, receiver equalization, or a combination of the two to overcome the loss of high-frequency signal components. Adaptive transmit pre-emphasis or receive equalization may be used for marginal links or links whose transfer characteristic change over time. In either case, the received signal quality may be measured at the receiver. Adaptive transmit pre-emphasis schemes may therefore use some form of back-channel communication to relay indicia of signal quality back to the transmitter. Unfortunately, the need for a backchannel renders the design and implementation of adaptive pre-emphasis challenging and complex. Also important, some integrated circuits that receive data via a serial link may not include a compatible backchannel receiver with which to communicate. The transmit and receive circuitry may be parts of integrated circuits from different vendors, for example, in which case the two vendors would have to agree in advance upon a backchannel communication scheme and design their circuitry accordingly. Such collaboration may be impractical.

Adaptive receive equalization does not require backchannel communication, and thus avoids many of the problems inherent in adaptive transmit pre-emphasis. Optimum pre-emphasis and equalization settings are data specific, however, because different data patterns have different spectral content, and thus are affected differently by low-pass characteristics of the channel. As a first-order approximation, the higher the frequency, the greater the attenuation. Transmitters "know" the transmitted data pattern in advance, and thus can tailor the transmit pre-emphasis to the data; in contrast, receivers do not know the received data pattern in advance, and so adaptive equalization that addresses changes to the incoming data is much more difficult.

Some adaptive receive equalization schemes measure the power density of received signals at two frequencies and adjust the receive equalizer to maintain some desired ratio of the two power densities. Unfortunately, such schemes may not provide appropriate levels of equalization for frequencies other than those monitored. Furthermore, noise at a monitored frequency contributes to the measured power density, and consequently results in erroneous equalizer settings. There is therefore a need for receive equalization systems and methods that are more responsive to received data patterns and less sensitive to noise.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
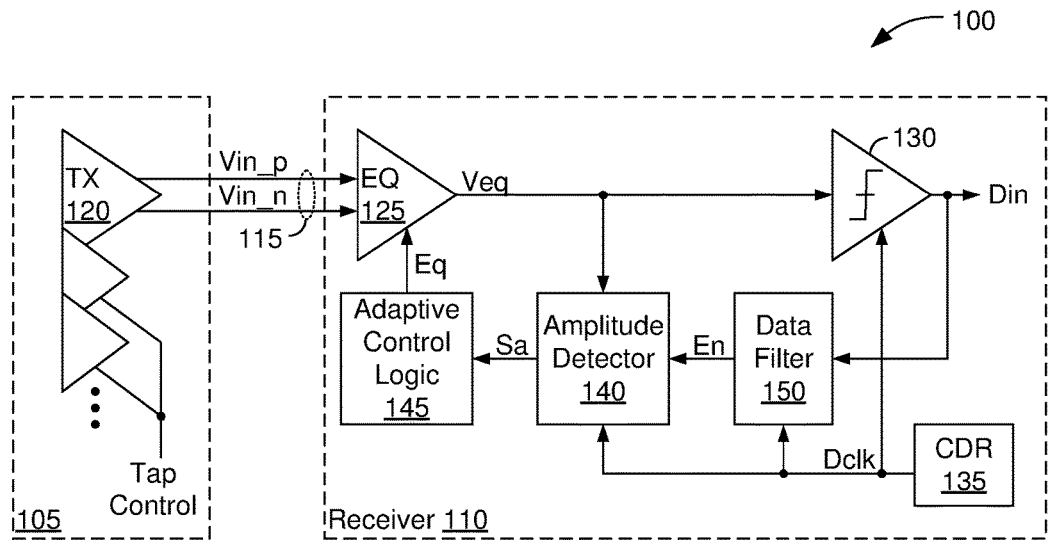
FIG. 1 depicts a communication system 100 in accordance with one embodiment.

FIG. 1 depicts a communication system 100 in accordance with one embodiment. System 100 includes a transmitter 105 that transmits a differential data signal Vin (Vin_p/Vin_n) to a receiver 110 via a differential channel 115. A conventional transmitter may be employed as transmitter 105, so a detailed treatment is omitted here for brevity. Transmitter 105 optionally includes transmit pre-emphasis circuitry to dynamically adjust the data signal Vin to reduce signal distortion caused by the effects of channel 115. Such transmit pre-emphasis circuitry may include, for example, a multi-tap transmit amplifier 120 adapted to cause the voltage amplitudes of the data symbols of signal Vin to be selectively increased or decreased based on the data values of pre and/or post cursor data symbols.

Communication system 100 also includes a receiver 110 that receives data signal Vin. Receiver 110 includes an equalizer 125 that equalizes data signal Vin to produce an equalized signal Veq. Equalizer 125 adjusts the magnitude (e.g., voltage and/or current) of at least some data symbols in data signal Vin. In some embodiments, equalizer 125 selectively adjusts the voltage amplitude of at least some of the data symbols in data signal Vin. In some embodiments, equalizer 125 selectively adjusts the current used to express at least some of the data symbols in data signal Vin. In one embodiment, equalizer 125 receives signal Vin, via a differential input port, and amplifies signal Vin using a range of amplification factors, with higher frequency components of Vin being treated to higher amplification factors. If channel 115 exhibits a low pass filter effect, then such an equalizer may be used to, for example, compensate for the low-pass nature of channel 115. In that case, the degree to which equalizer 125 amplifies higher frequency signals relative to lower frequency signals can be adjusted via an equalizer input port Eq. A conventional sampler 130 samples the equalized signal Veq in synchronization with a data clock Dclk to produce a first sampled data signal Din. Data clock Dclk is, in this example, recovered from the input data using a conventional clock-and-data recovery circuit (CDR) 135.

A sampler suitable for use as sampler 130 is described in "0.622-8.0 Gbps 150 mW Serial IO Macrocell with Fully Flexible Preemphasis and Equalization," by Ramin Farjad-Rad, et al. (2003 Symposium on VLSI Circuits Digest of Technical Papers), which is incorporated herein by reference. Other suitable receive samplers might also be used.

An amplitude detector 140 periodically samples, in synchronization with clock signal Dclk, the symbol amplitude Sa of equalized input signal Veq. Some adaptive control logic 145 then calculates the appropriate equalization setting based upon measured symbol amplitudes and adjusts equalizer 125 accordingly. An equalization setting may thus be selected to maximize the amplitude of sampled data at the appropriate sample instant. Receiver 110 additionally includes a data filter 150 that selectively enables amplitude detector 140. Data filter 150 causes amplitude detector 140 to measure and record the amplitude of a subset of possible data patterns, such as those associated with higher frequencies.

Figure 2:
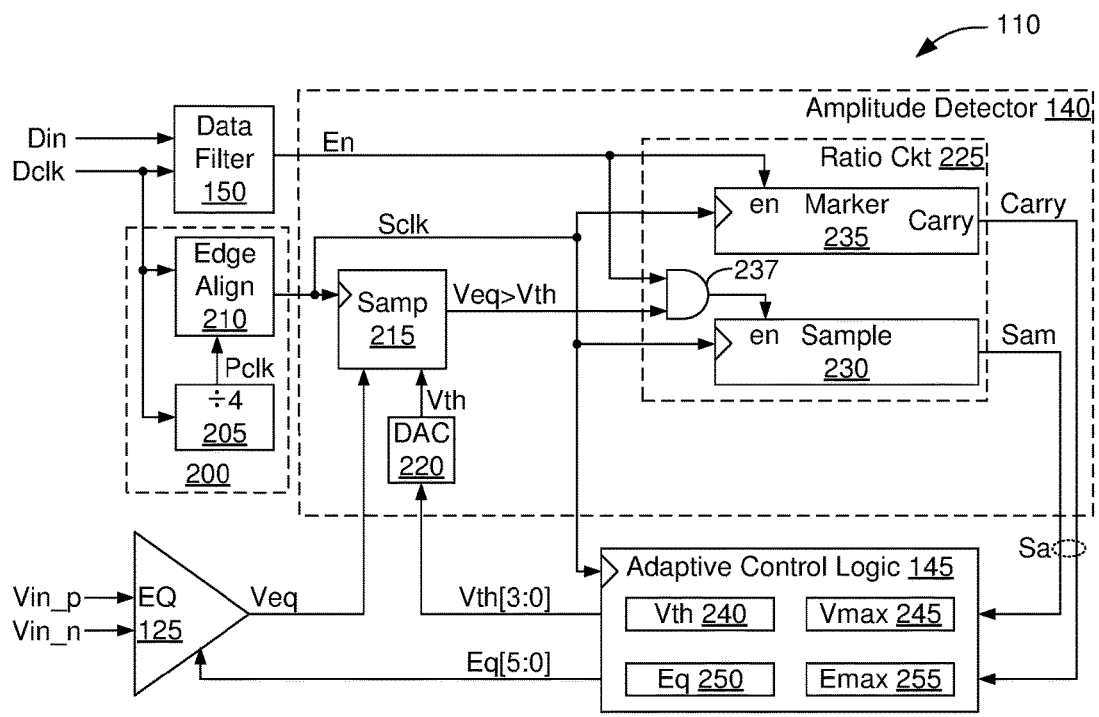
FIG. 2 depicts a receiver in accordance with an embodiment.

FIG. 2 depicts portions of receiver 110 of FIG. 1, in accordance with one embodiment, like-labeled elements being the same or similar. FIG. 2 additionally depicts clock reduction circuitry 200 that reduces the frequency of data clock Dclk by e.g. a factor of four to ease the implementation of the adaptive control circuits and logic. For example, in an embodiment in which the frequency of data clock Dclk is 3.125 GHz, clock reduction circuitry 200 divides data clock Dclk by four to produce a 781 MHz sample clock Sclk. Using this lower sample clock frequency, the circuitry of amplitude detector 140 and adaptive control logic 145 can be synthesized using a standard cell library for significantly reduced design time and improved efficiency. Clock reduction circuitry 200 includes a clock divider 205 that divides the frequency of the data clock by a factor K (where in the embodiment depicted in FIG. 2, K=4) to produce an intermediate clock signal Pclk and an edge aligner 210 that aligns intermediate clock Pclk with data clock Dclk to produce a sample clock Sclk.

Amplitude detector 140 includes, in this embodiment, a sampler 215, a digital-to-analog converter (DAC) 220, and a ratio circuit 225. To measure the amplitude of equalized signal Veq from equalizer 125, sampler 215 samples signal Veq with respect to a threshold voltage Vth, asserting a second sampled data signal Veq>Vth if the amplitude of signal Veq is greater than threshold voltage Vth at the sample instant defined by sample clock Sclk. The amplitude of signal Veq can thus be measured by comparing the amplitude of signal Veq with a range of threshold voltages Vth. In this example, signal Veq is compared with a range of threshold voltages Vth to determine the highest threshold voltage Vth for which signal Veq exceeds voltage Vth (e.g., the highest value of threshold voltage Vth for which sampled data signal Veq>Vth is a logic one).

Ratio circuit 225 filters signal Veq>Vth by accumulating the number of times signal Veq>Vth is asserted for a desired number of samples. In this embodiment, a marker counter 235 establishes the selected number of samples, while a sample counter 230 accumulates the number of times signal Veq>Vth is asserted. Sample counter 230 increments each time the sampled signal Veq is greater than the selected threshold voltage Vth, while marker counter 230 increments each time signal Veq is sampled. Marker counter 235 issues a carry signal Carry upon reaching the desired number of samples, at which time the contents of counter 230 is indicative of the number of samples for which signal Veq exceeded the selected threshold voltage Vth over the number of samples. The contents of counter 230 divided by the count at which marker counter 235 issues carry signal Carry is a measure of the probability that equalized signal Veq exceeded threshold voltage Vth at the sample instants. In one embodiment, equalized signal Veq is considered to exceed threshold voltage Vth when the contents of counter 230 exceeds about 90% of the count at which marker counter 235 issues the carry signal.

An AND gate 237 gates signal Veq>Vth using the enable signal from data filter 150. Enable signal En is asserted to enable counters 230 and 235 so that ratio circuit 225 only accumulates data in response to specified data patterns, as determined by data filter 150. When high frequency components of Vin are attenuated relative to its low frequency components, which could be expected to occur, for example, as Vin traveled from transmitter 105 to receiver 110 over channel 115, data filter 150 may be configured to enable ratio circuit 225 in response to input data patterns expressing relatively high frequencies (e.g., a series of alternating ones and zeroes, as opposed to a series of consecutive ones or a series of consecutive zeroes). Data filter 150 can be adjusted, in some embodiments, to enable ratio circuit 225, and thus amplitude detector 140, in response to different patterns, to measure the equalized signal at different frequencies or to optimize the receiver for different frequencies, for example.

In one embodiment, control logic 145 examines signals Carry and Sam for each of a range of threshold voltages Vth to measure the amplitude of signal Veq for a given equalizer setting Eq. Control logic 145 then repeatedly measures the amplitude of signal Veq at different equalizer settings to find the equalizer setting that produces the highest amplitude of signal Veq. To accomplish this end, adaptive control logic 145 includes a first register 240 that stores a digital threshold value Vth, a second register 245 that stores the value Vmax currently associated with the highest value of signal Veq, a third register 250 that stores the current equalizer setting Eq, and a fourth register 255 that stores the equalizer setting Emax thus far producing the highest equalized signal amplitude. Though omitted for brevity, adaptive control logic 145 may additionally convey control signals to ratio circuit 225 that enable control logic to reset counters 230 and 235. In some embodiments, counters 230 and 235 can be programmed to sample different numbers of bits, 256, 128, 64, or 32 in one example.

Figure 3:
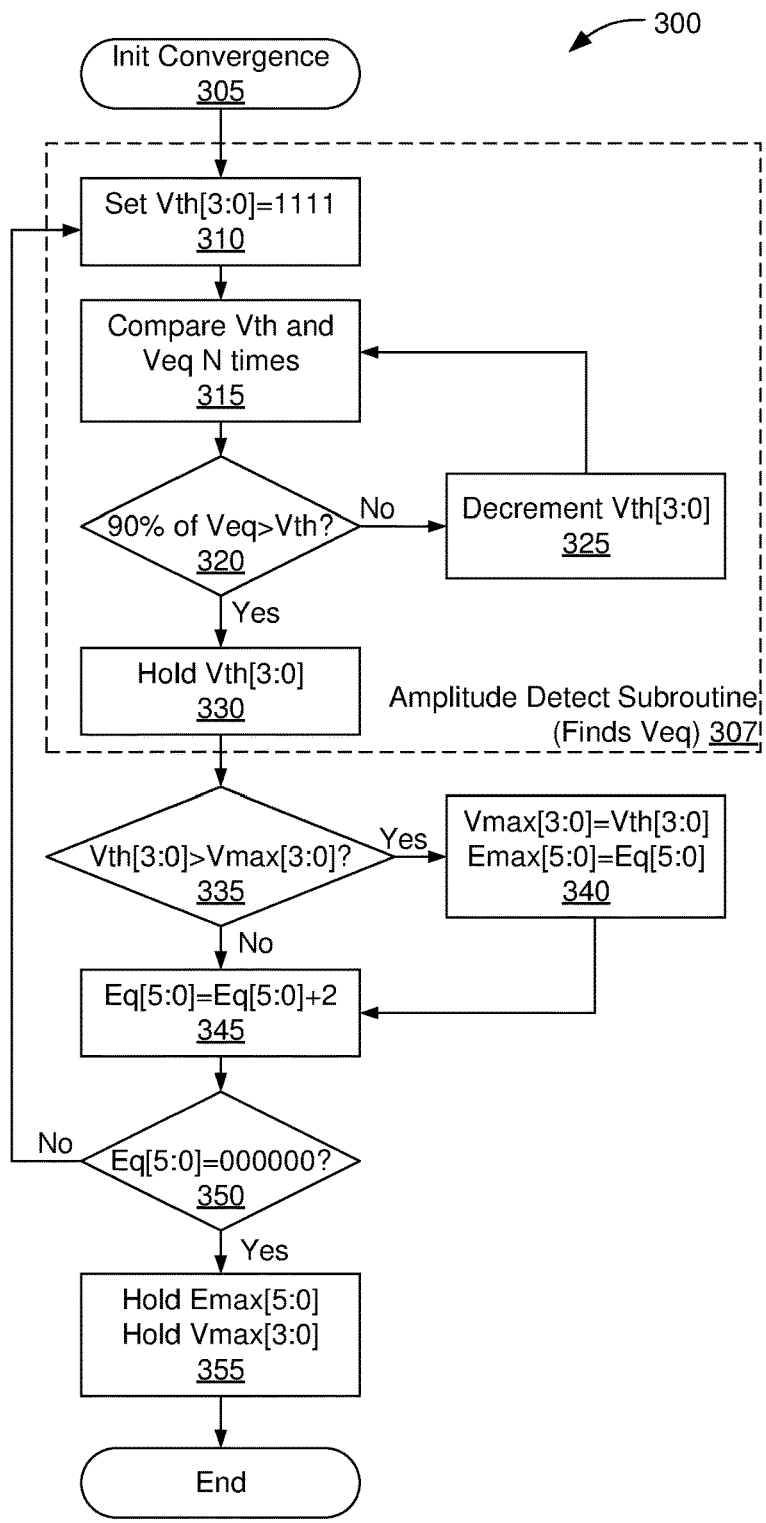
FIG. 3 depicts a flowchart illustrating a convergence algorithm 300 that may be used by adaptive control logic 145 and amplitude detector 140 of FIG. 1 or 2 to select an equalization setting for equalizer 125, in accordance with some embodiments.

FIG. 3 depicts a flow chart illustrating a convergence algorithm 300 that may be used by adaptive control logic 145 and amplitude detector 140, in one embodiment, to select an equalization setting for equalizer 125. FIG. 3 describes one method of operation of a receiver that may be used as receiver 110 of FIGS. 1 and 2.

Convergence is initiated when an input signal is detected, at chip start-up, for example (step 305), at which time registers 240, 245, 250, and 255 are each set to zero. Next, an amplitude-detect subroutine 307 indirectly measures the amplitude of signal Veq by finding the highest threshold voltage Vth for which the equalized input signal Veq is greater than the threshold voltage Vth for e.g. about 90% of the sampled symbols. To accomplish this in one embodiment, adaptive control logic 145 first sets threshold count Vth to 1111, a value corresponding to the highest threshold voltage Vth (step 310). Amplitude detector 140 then compares signal Veq with threshold voltage Vth over 256 samples (step 315), incrementing sample counter 230 each time signal Veq is found to exceed voltage Vth. If signal Veq does not exceed voltage Vth over 224 times out of the 256 samples (decision 320), then count Vth is decremented to reduce voltage Vth (step 325) and the comparison of step 315 is repeated. This process is repeated until signal Veq exceeds voltage Vth at least 224 times out of 256 samples (11100000 out of 11111111), in which case threshold count Vth is held in register 240 (step 330) to complete subroutine 307.

In the example of FIG. 2, marker counter 235 indicates a maximum count of 256 by asserting a carry signal Carry to adaptive control logic 145. The calculation of the sample ratio may be based upon other numbers of samples, and the ratio used to identify the signal amplitude of Veq may be different. In some embodiments, the number of samples, the ratio, or both are programmable. In one embodiment in which counters 230 and 235 are each eight bits, the signal Sam from counter 230 is the AND of the highest three bits, in which case Sam is a logic one when the value in sampler counter 230 is at least 224 (binary 11100000). Thus, if both Sam and Carry are logic one (Sa=1,1), then sampler counter 230 counted to at least 224 by the time marker counter 235 reached a maximum count and thus generated a carry.

In the next decision 335, the current threshold count Vth is compared with count Vmax. If Vth is greater than Vmax, then the current equalizer setting is producing a higher equalized signal amplitude (e.g., a wider eye) than the equalizer setting Emax, the equalizer setting previously associated with the highest equalized signal amplitude. In that case, Vmax is updated with the value Vth and Emax is updated with Eq (step 340). If Vth is not greater than Vmax, then the current equalizer setting is not producing a higher signal amplitude than whatever equalizer setting is currently associated with the highest signal amplitude. In that case, Vmax is held constant while the equalizer setting Eq is increased (step 345). Equalizer setting Eq is increased by two in this example, to more quickly span the range of equalizer settings employed during the convergence process. Other embodiments change the equalizer settings in different steps, different orders, etc.

The next decision 350 determines whether the equalizer setting Eq is zero, indicating the count Eq has traversed the available range of equalizer settings and rolled over to zero; if not, the process returns to subroutine 307. This sequence of steps repeats over the range of equalizer settings with step 340 accumulating counts Vmax and Emax, which respectively represent the highest value Vth for which signal Veq exceeds threshold voltage Vth for about 90% of sampled data and the equalization setting responsible for that maximum threshold setting. These final values of Vmax and Emax are held (step 355), completing the convergence process.

Convergence algorithm 300 finds the optimal or a near-optimal equalization setting for a given communication channel, and may be repeated as needed to reacquire equalization settings. In some embodiments, for example, receivers adapted in accordance with some embodiments reacquire equalization settings each time power is applied. These and other embodiments may additionally benefit from adaptive equalization schemes that continuously or periodically update equalization settings to account for changes in the system operating environment, such as in response to changes in temperature, supply-voltage, or other factors that impact receiver performance.

Figure 4:
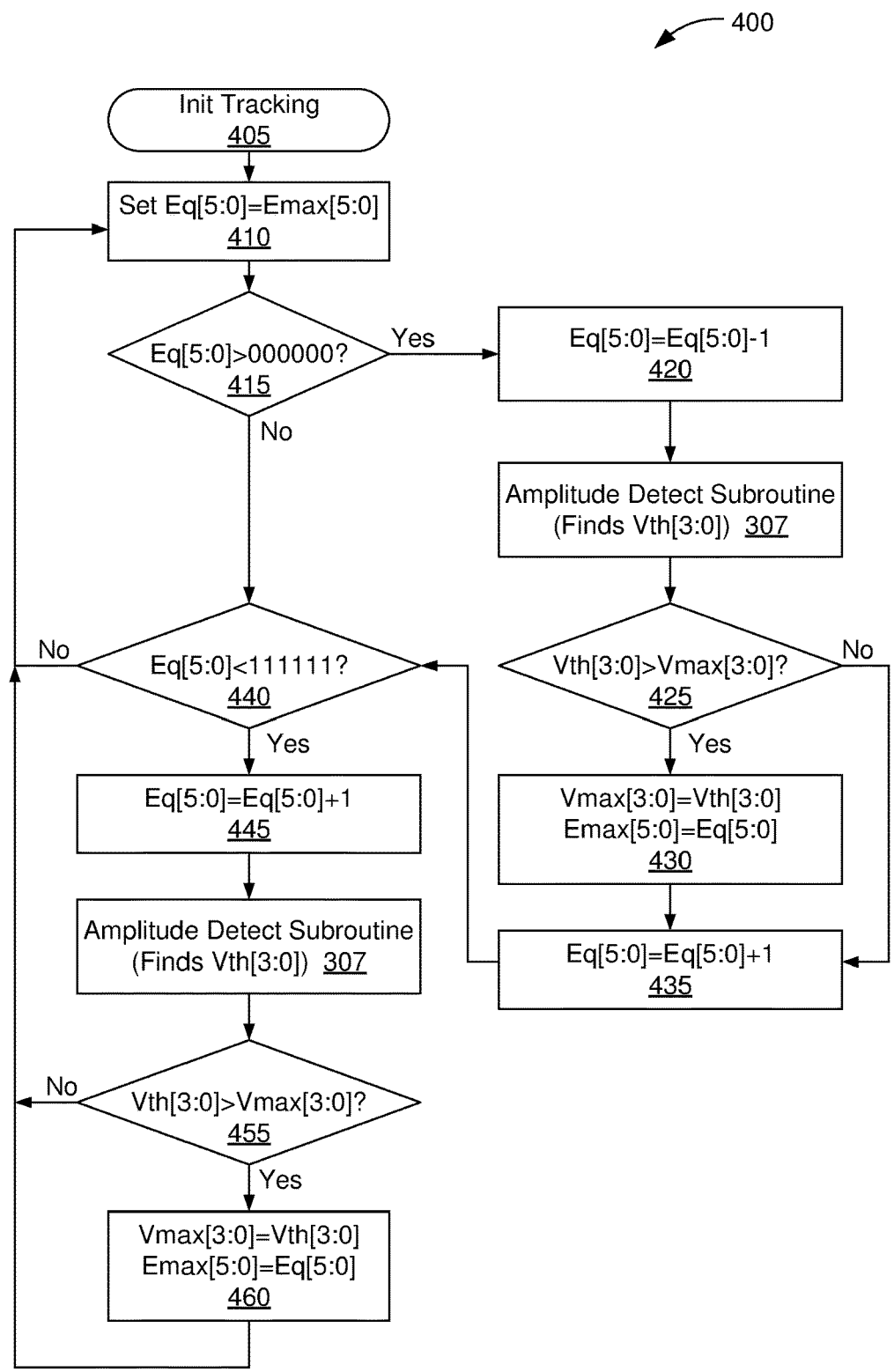
FIG. 4 is a flowchart illustrating a tracking algorithm 400, which may be used by adaptive control logic 145 of FIG. 1 or 2 in accordance with some embodiments.

FIG. 4 is a flowchart illustrating a tracking algorithm 400 that may be implemented by adaptive control logic 145 of FIGS. 1 and 2 in accordance with one embodiment. Some embodiments periodically or continuously execute a tracking algorithm after executing a convergence algorithm, such as, for example, the convergence algorithm 300 of FIG. 3, to adjust for changes, such as noise, for example, in the signaling environment. Briefly, algorithm 400 measures the symbol amplitude of signal Veq for equalizer settings one count above and one count below the current equalizer setting. If one of those settings produces a higher signal amplitude, the equalizer setting is adjusted to that improved setting. Other embodiments repeat the convergence algorithm to adapt to environmental changes or omit the convergence algorithm altogether, relying instead upon a tracking algorithm.

After tracking is initiated (step 405), control logic 145 begins by setting register 250 to the value stored in register 255 (step 410). The equalization setting for equalizer 125 is thus set to the value earlier determined to lead to the highest amplitude for signal Veq. If the contents of register 250 is greater than zero (decision 415), then register 250 is decremented to reduce Eq by one (step 420). Amplitude detect subroutine 307, described above in connection with FIG. 3, is then called to measure the amplitude of signal Veq with the new equalizer setting. Per decision 425, if the new equalizer setting produces a higher signal amplitude for Veq, as evinced by a threshold value Vth greater than Vmax, then the contents of registers 245 and 255 are updated with the respective contents of registers 240 and 250 (step 430). The content of register 250 is then incremented (step 435), returning Eq to the value preceding the last instance of step 420.

If, at this time, the content of register 250 is less than the maximum count (decision 440), then the content of register 250 is incremented once again (step 445). Amplitude detect subroutine 307 is once again called to measure the amplitude of signal Veq, this time to determine whether a slightly higher equalizer setting provides a higher amplitude signal Veq than the prior equalizer setting (decision 455). If so, then the contents of registers 245 and 255 are updated with the respective contents of registers 240 and 250 (step 460). The tracking algorithm then returns to step 410. Tracking algorithm 400 can be turned off periodically to save power.

Figure 5:
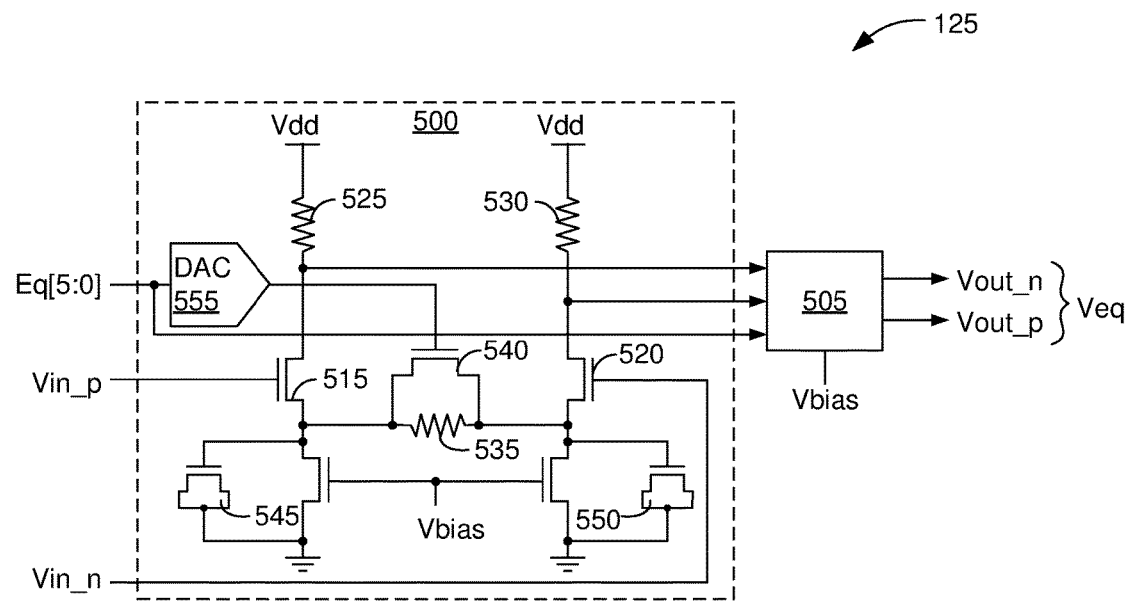
FIG. 5 schematically depicts an equalizer that may be used to implement equalizer 125 in accordance with one embodiment.

FIG. 5 schematically depicts equalizer 125 of FIGS. 1 and 2 in accordance with one embodiment. Equalizer 125 includes two nearly identical stages 500 and 505, the second of which is depicted as a black box for ease of illustration. Other embodiments include more or fewer stages. Equalizer stage 500 includes a pair of differential input transistors 515 and 520 with respective loads 525 and 530. Source degeneration is provided by a resistor 535, a transistor 540, and a pair of capacitor-coupled transistors 545 and 550. The capacitance provided by transistors 545 and 550 is in parallel with resistor 535 and transistor 540, so the net impedance between the sources of transistors 515 and 520 decreases with frequency. As a consequence, the gain of equalizer stage 500 increases with frequency. The resistance through transistor 540 can be adjusted to change the source-degeneration resistance, and thus to alter the extent to which the gain of equalizer stage 500 increases with frequency.

In an alternative embodiment, source degeneration is provided by one or more floating metal-insulator-metal (MIM) capacitors connected in parallel with resistor 535. One such embodiment is detailed in the above-referenced paper to Farjad-Rad et al. The MIM capacitors can be used instead of or in addition to capacitors 545 and 550.

A DAC 555 converts the digital equalization setting Eq from, in this embodiment, adaptive control logic 145 to a gate voltage for transistor 540. The value of the equalization setting thus determines the resistance between the drains of transistors 515 and 520, and consequently the shape of the gain curve of equalizer stage 500. In general, the higher the resistance between the sources of transistors 515 and 520, the more extreme the gain curve of stage 500 over the frequency range of interest. In one embodiment, the output voltage from DAC 555 decreases as setting Eq increases from 000000 to 100000, remaining constant for higher counts. These maximum counts represent highest resistance between the sources of transistors 515 and 520, and consequently maximum equalization for stage 500. The output voltage from a similar DAC (not shown) in stage 505 remains high for counts up to 100000, decreasing count-by-count for higher values. Thus, the lowest equalization setting (Eq=000000) represents the lowest source-degeneration resistance for both stages 500 and 505, while the highest equalization setting (Eq=111111) represents the highest resistance.

Figure 6:
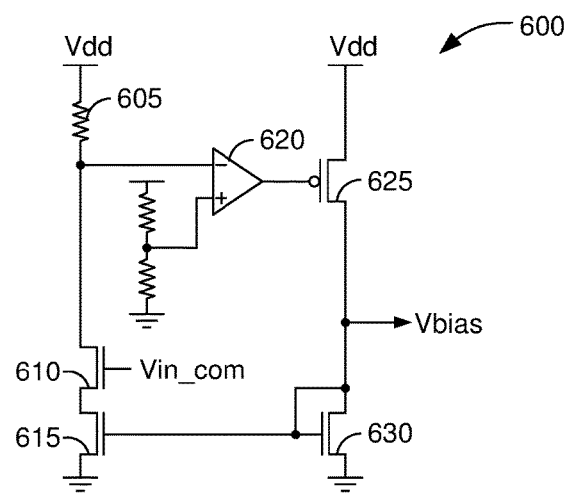
FIG. 6 schematically depicts a bias-voltage generator for use with equalizer 125 of FIG. 5.

FIG. 6 schematically depicts a bias-voltage generator 600 for use with equalizer 125 of FIG. 5. A resistor 605 and transistors 610 and 615 form a half-circuit replica of equalizer stage 500, with the input common-mode voltage Vin_com applied to the gate of transistor 610. A feedback loop including an amplifier 620 and a pair of transistors 625 and 630 sets the voltage on the inverting (−) terminal of amplifier 620 equal to the voltage applied to the non-inverting (+) terminal. In an embodiment in which supply voltage Vdd is 1.2 volts, a resistor divider provides one-volt to the non-inverting terminal of amplifier 620. The resulting bias voltage Vbias to stages 500 and 505 establishes a one-volt common-mode voltage for those stages. In some embodiments, lower common-mode voltages are avoided to ensure that transistors 515 and 520 of FIG. 5 are always in saturation. The half circuit of FIG. 6 can be scaled down, by a factor of eight in one example, to save power.

Figure 7:
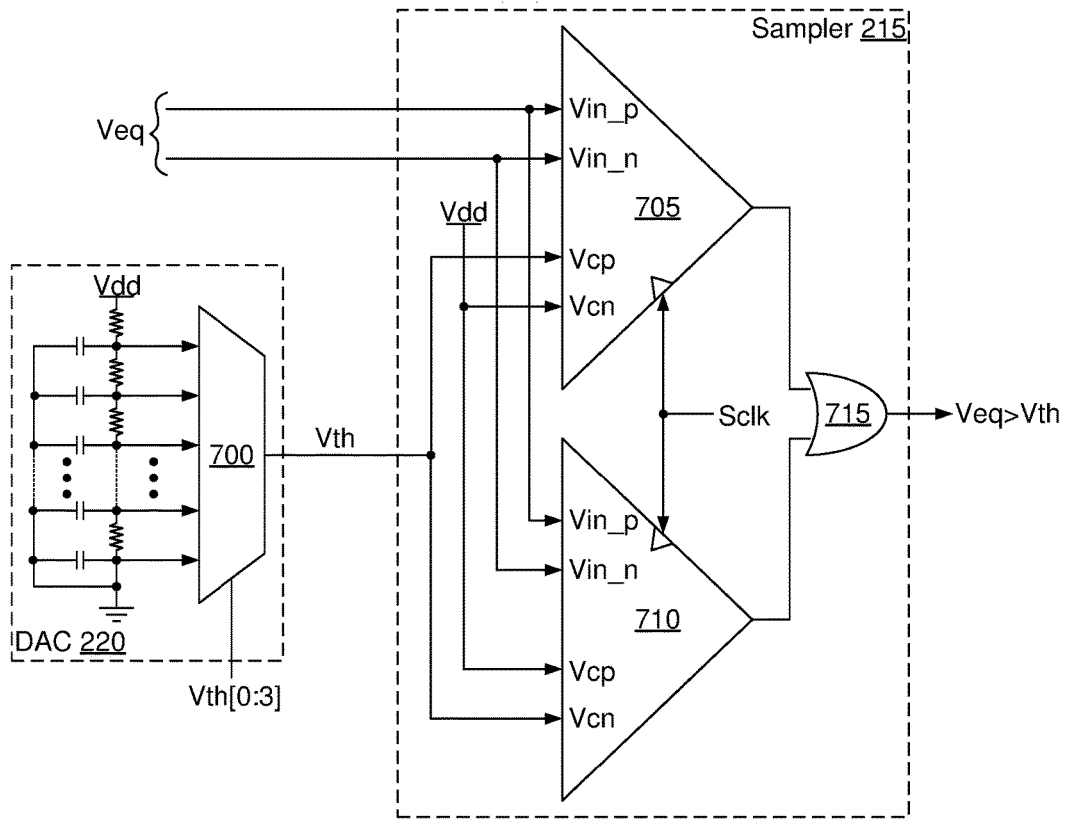
FIG. 7 schematically depicts a DAC and sampler that may be used to implement DAC 220 and sampler 215 of FIG. 2 in accordance with one embodiment.

FIG. 7 schematically depicts DAC 220 and sampler 215 of FIG. 2 in accordance with one embodiment. DAC 220 includes a sixteen-input multiplexer (MUX) 700 with four select terminals that receive a digital representation of the voltage threshold Vth from adaptive control logic 145. The input terminals of MUX 700 connect to nodes of a voltage divider network. A capacitor at each of the reference voltage steps reduces the AC impedance of each node without using low resistances in the ladder, which would result in high DC current consumption. A low AC impedance causes the selected reference voltage to appear quickly on node Vth for the next sampling period. The effective AC impedances of the input and reference lines are similar, as mismatches may affect the comparison decision. In one embodiment, threshold voltage Vth can be adjusted over a range of from 0.8 volts to 1.2 volts. Threshold voltage Vth is single ended in the embodiment of FIG. 7 to reduce the amount of reference circuitry, though threshold voltage Vth may be differential in other embodiments.

In one embodiment, sampler 215 includes a pair of samplers 705 and 710, the outputs of which are combined by an OR gate 715 to produce output signal Veq>Vth. Both samplers 705 and 710 compare equalized signal Veq from equalizer 125 with the voltage difference between supply voltage Vdd and threshold voltage Vth from DAC 220. These two reference terminals are reversed between samplers 705 and 710 so that signal Veq>Vth is a logic one if the absolute value of Veq is greater than the difference between voltages Vdd and Vth. Both samplers 705 and 710 are timed to clock signal Sclk, which is in turn timed to the incoming data, so the comparison between the amplitude of voltage Veq and the difference between voltages Vdd and Vth provides a measure of the eye opening of the received data. Equalization settings are thus based upon measurements of the desired signal characteristic, in contrast to analog methods that fail to distinguish noise from the valid signal.

Figure 8:
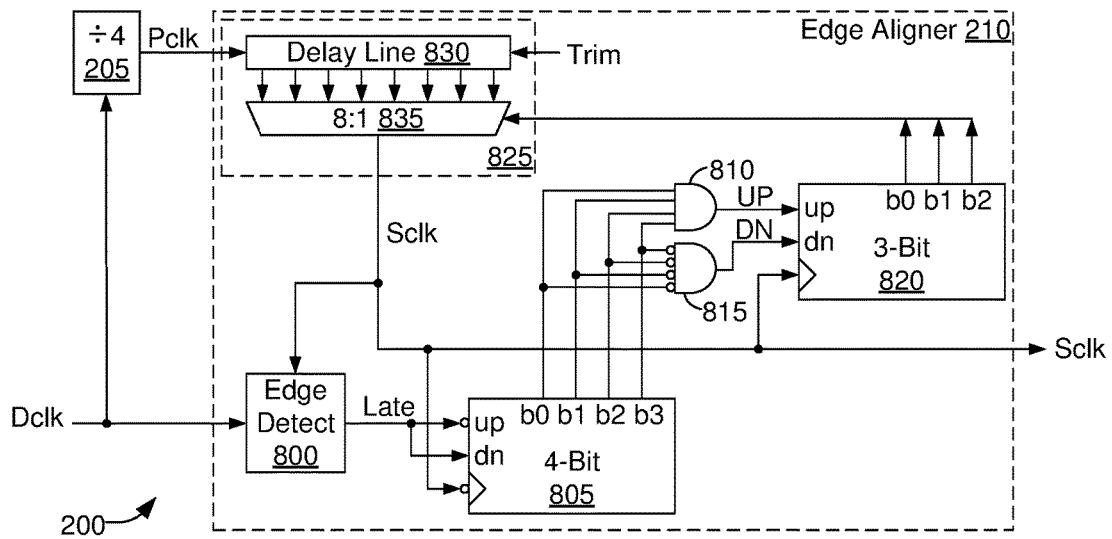
FIG. 8 details an embodiment of clock reduction circuitry that may be used to implement the clock reduction circuitry 200 of FIG. 2, which reduces the frequency of data clock Dclk by a factor of e.g. four and creates sample clock Sclk edge aligned with data clock Dclk.

FIG. 8 details an embodiment of clock reduction circuitry 200 of FIG. 2, which reduces the frequency of data clock Dclk by a factor of e.g. four and creates sample clock Sclk edge aligned with data clock Dclk. Reducing the clock frequency simplifies the design of the amplitude detector 140 and adaptive control logic 145, in some cases allowing them to be synthesized using a standard cell library. Edge aligner 210 aligns edges of sample clock Sclk with data clock Dclk so that amplitude measurements made by amplitude detector 140 are indicative of the amplitude detected by sampler 130 (FIG. 1).

An edge detector 800 compares the rising edges of data clock Dclk and sample clock Sclk, asserting a late signal Late if an edge of signal Sclk occurs after a corresponding edge of signal Dclk and de-asserting late signal Late if an edge of signal Sclk occurs before an edge of signal Dclk. A four-bit Up/Down counter 805 and a pair of AND gates 810 and 815 collectively act as a digital low-pass filter. This filter generates a down signal DN to a second Up/Down counter 820 when the late signal Late is asserted for eight more clock cycles than de-asserted, and generates an up signal UP when signal Late is de-asserted eight more clock cycles than asserted. Counter 805 resets to a b=1000 state once it overflows (b=1111) or underflows (b=0000).

The content of counter 820 controls the delay imposed by a phase picker 825 to control the timing of sample clock Sclk relative to data clock Dclk. Phase picker 825 includes a delay line 830 (e.g., a series of buffers) providing eight phases of clock signal Pclk to respective input terminals of a multiplexer 835. Counter 820 is a saturating counter, so when reaching 111 (or 000) does not roll over to 000 (or 111), when getting another up (or down) pulse. A multiplexer 835 selects one of the eight phases from tapped delay line 830, whose range spans at least half a bit time (0.5 times one unit interval, or 0.5UI, of data clock Dclk) across all corners of operation. In one embodiment, the granularity of delay line 830 does not increase more than 0.2UI, leading to a quantization error of less than 0.1UI. Trim bits to delay line 830 can be included to cover a large range of the operating speeds. In one embodiment, for example, the trim bits allow edge aligner 210 to cover three regions of operation speeds: 4.25-6.25 Gbps, 2.125-3.125 Gbps, and 1.062-1.56 Gbps.

Figure 9:
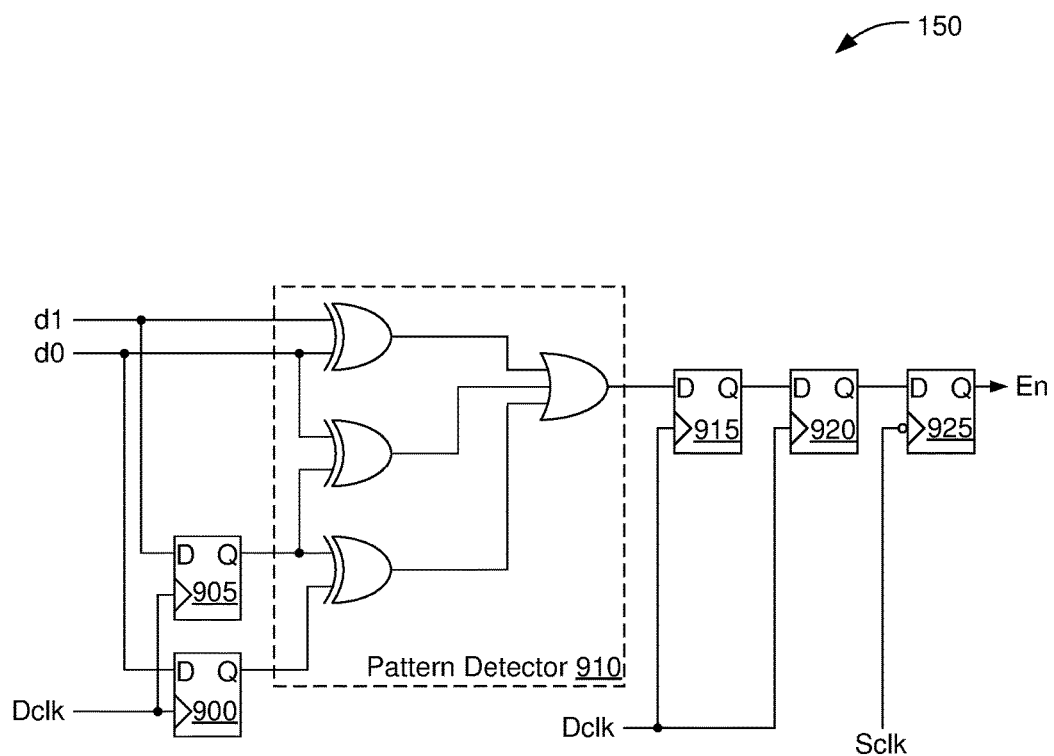
FIG. 9 depicts data filter that may be used to implement the data filter 150 of FIG. 1 in accordance with one embodiment.

FIG. 9 depicts data filter 150 of FIG. 1 in accordance with one embodiment. Signal Veq is measured around signal transitions to best measure the effects of equalization on signal-eye amplitude. Data filter 150 enables amplitude detector 140 around transitions so that the output of amplitude detector 140 accurately represents eye amplitude in the presence of transitions. This configuration allows for optimization of eye openings, or equalized-symbol amplitude, for minimum post-cursor (or post-symbol) and pre-cursor inter-symbol interference (ISI).

Data filter 150 includes a pair of flip-flops 900 and 905 timed to data clock Dclk to retain prior samples of a pair of incoming data bits d0 and d1. Pattern detection circuitry 910 monitors the two prior data samples from flip-flops 900 and 905 and the two most recent data samples d0 and d1, producing a logic-one output signal in response to signal transitions. A pair of flip-flops 915 and 920 provides a two-cycle pipeline delay to account for two previous bits and one bit after the monitored bit. A final flip-flop 925 captures the output of flip-flop 920 on falling edges of sample clock Sclk and passes the resulting enable signal En to ratio circuit 225 (FIG. 2). Data filter 150 can be adapted to detect different patterns, and may be programmable in other embodiments.

In the foregoing description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments. As another example, circuits described or depicted as including metal oxide semiconductor (MOS) transistors may alternatively be implemented using bipolar technology or any other technology in which a signal-controlled current flow may be achieved. With respect to terminology, a signal is said to be "asserted" when the signal is driven to a low or high logic state (or charged to a high logic state or discharged to a low logic state) to indicate a particular condition. Conversely, a signal is said to be "de-asserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or de-asserts, if explicitly stated or indicated by context) the signal on a signal line coupled between the signal driving and signal receiving circuits. A signal line is said to be "activated" when a signal is asserted on the signal line, and "deactivated" when the signal is de-asserted. Whether a given signal is an active low or an active high will be evident to those of skill in the art.

The output of the design process for an integrated circuit may include a computer-readable medium, such as, for example, a magnetic tape, encoded with data structures defining the circuitry can be physically instantiated as in integrated circuit. These data structures are commonly written in Caltech Intermediate Format (CIF) or GDSII, a proprietary binary format. Those of skill in the art of mask preparation can develop such data structures from schematic diagrams of the type detailed above.

While the present invention has been described in connection with specific embodiments, variations of these embodiments will be obvious to those of ordinary skill in the art. For example, 1. the amplitude of equalized signal Veq can be measured indirectly by monitoring the output of a second equalizer with input terminals coupled to terminals Vin_p and Vin_n and sharing selected equalizer settings;
2. a single sampler could be used to recover data and measure the amplitude of the equalized symbols (e.g., in a system that supported operational and calibration modes);
3. embodiments of the invention may be adapted for use with multi-pulse-amplitude-modulated (multi-PAM) signals; and
4. signals can be equalized to compensate for distortion other than that caused by the low-pass nature of some channels (e.g., signals can be equalized to compensate for high-pass effect, band-pass effects, or other types of distortion).
5. embodiments of the invention may measure the magnitude of data symbols by detecting a current amplitude, voltage amplitude, or both.

Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A receiver comprising:
   a sampler to issue a decision signal indicative of when an input signal exceeds a threshold voltage;
   circuitry to accumulate a first count indicative of a first number of times the input signal has a characteristic and to accumulate a second count indicative of a second number of times the input signal has the characteristic while the decision signal of the sampler indicates that the input signal exceeds the threshold voltage; and
   control logic to adjust a parameter of the receiver responsive to the first count and the second count.

2. The receiver of claim 1, wherein the input signal expresses symbols and the characteristic includes a pattern of the symbols.

3. The receiver of claim 1, the control logic to adjust the parameter of the receiver responsive to a ratio of the first count and the second count.

4. The receiver of claim 1, wherein the input signal exhibits an eye opening over time and the control logic adjusts the parameter to increase the eye opening.

5. The receiver of claim 1, further comprising an equalizer to receive and equalize a data signal to produce the input signal as an equalized data signal.

6. The receiver of claim 5, further comprising a data filter to issue an enable signal responsive to a pattern in the input signal.

7. The receiver of claim 6, wherein the pattern includes at least one transition of the input signal.

8. The receiver of claim 5, wherein the control logic, to adjust the parameter, adjusts an equalization setting of the equalizer.

9. The receiver of claim 1, wherein the sampler issues the decision signal in synchronization with a sample-clock signal.

10. The receiver of claim 9, further comprising a second sampler to issue a second detection signal in synchronization with a data-clock signal.

11. The receiver of claim 10, wherein the sample-clock signal is of a lower frequency than the data-clock signal.

12. A method of equalizing an input signal to produce an equalized signal of an equalized-signal amplitude, the method comprising:
   equalizing the input signal at an equalizer setting;
   accumulating a first count indicative of a first number of times the equalized signal exhibits a characteristic;

accumulating a second count indicative of a second number of times the equalized signal exceeds a threshold while exhibiting the characteristic; and adjusting the equalizer setting responsive to the first count and the second count.

13. The method of claim 12, wherein the equalized signal expresses symbols and the characteristic includes a pattern of the symbols.

14. The method of claim 13, wherein the pattern of the symbols includes at least one transition of the equalized signal.

15. The method of claim 12, wherein adjusting the equalizer setting responsive to the first count and the second count comprises adjusting the equalizer responsive to a ratio of the first count to the second count.

16. The method of claim 12, wherein the equalized signal exhibits an eye opening over time, and wherein the second count is a function of the eye opening.

17. The method of claim 12, further comprising adjusting the threshold responsive to at least one of the first count and the second count.

18. The method of claim 17, wherein the threshold comprises a voltage.

19. The method of claim 12, further comprising sampling the equalized signal in synchronization with a sample-clock signal of a first frequency and accumulating the first count in synchronization with a second clock signal of a second frequency lower than the first frequency.

20. The method of claim 19, further comprising accumulating the second count in synchronization with the second clock signal.

* * * * *